April 3, 1962 R. C. CARLSON 3,028,582
CONTROL SYSTEM
Filed April 24, 1959 4 Sheets-Sheet 1
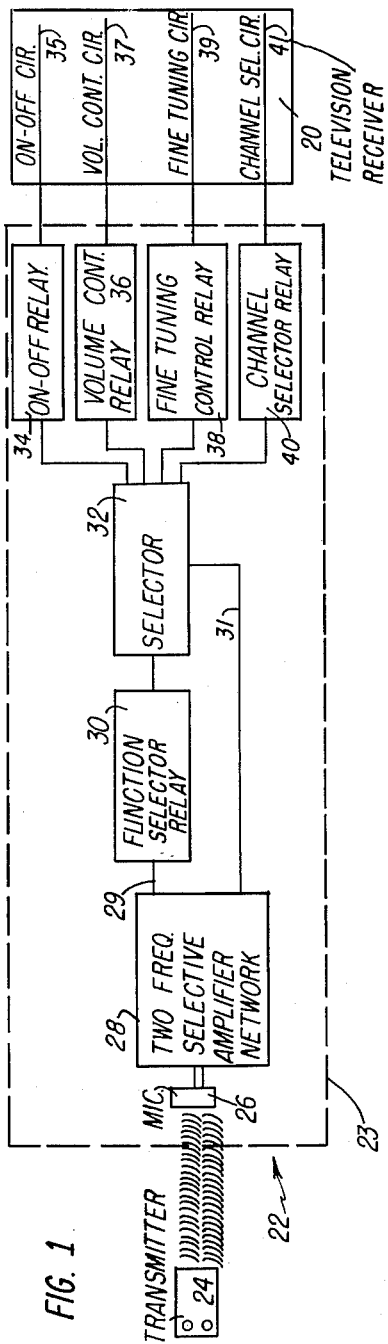
FIG. 1
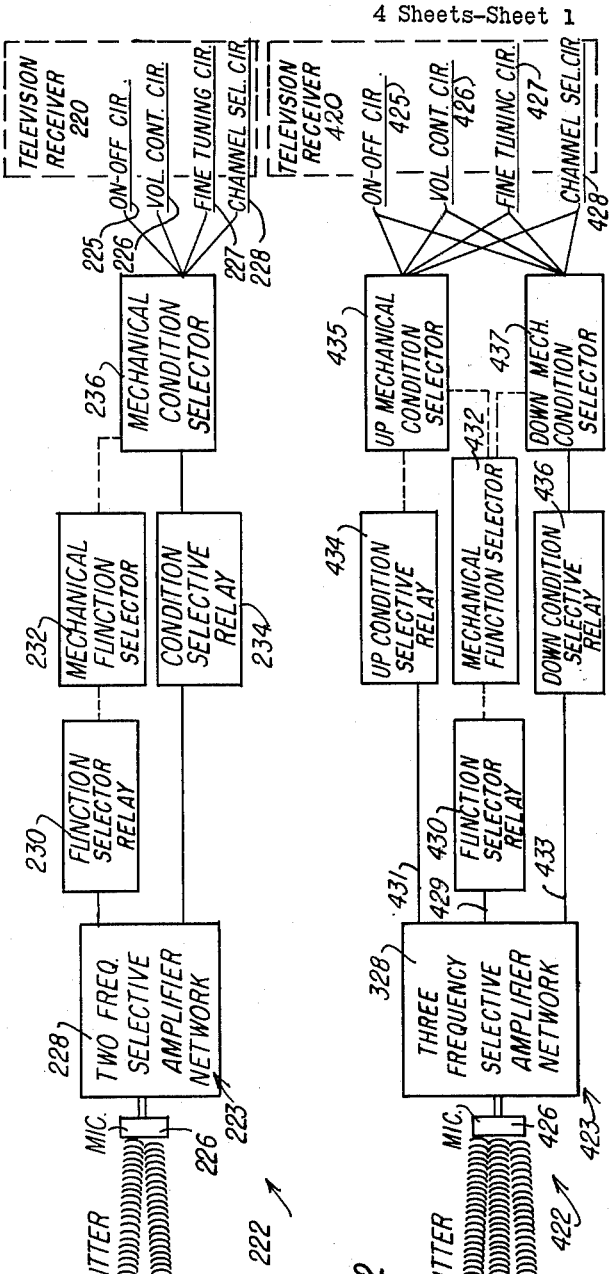
FIG. 3
FIG. 12
INVENTOR.
Reuben C. Carlson
BY
Attys.

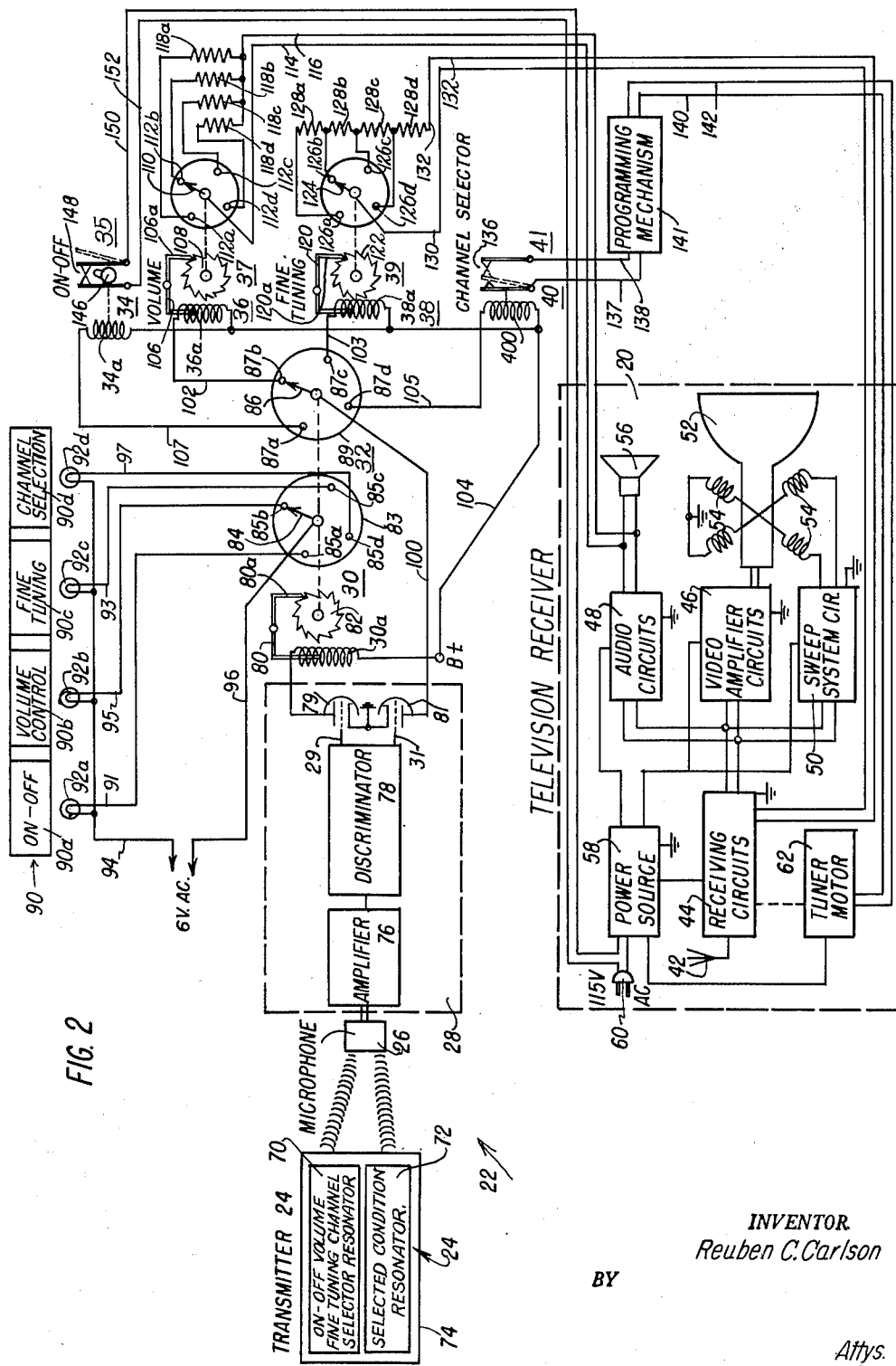

April 3, 1962     R. C. CARLSON     3,028,582
CONTROL SYSTEM
Filed April 24, 1959     4 Sheets-Sheet 3
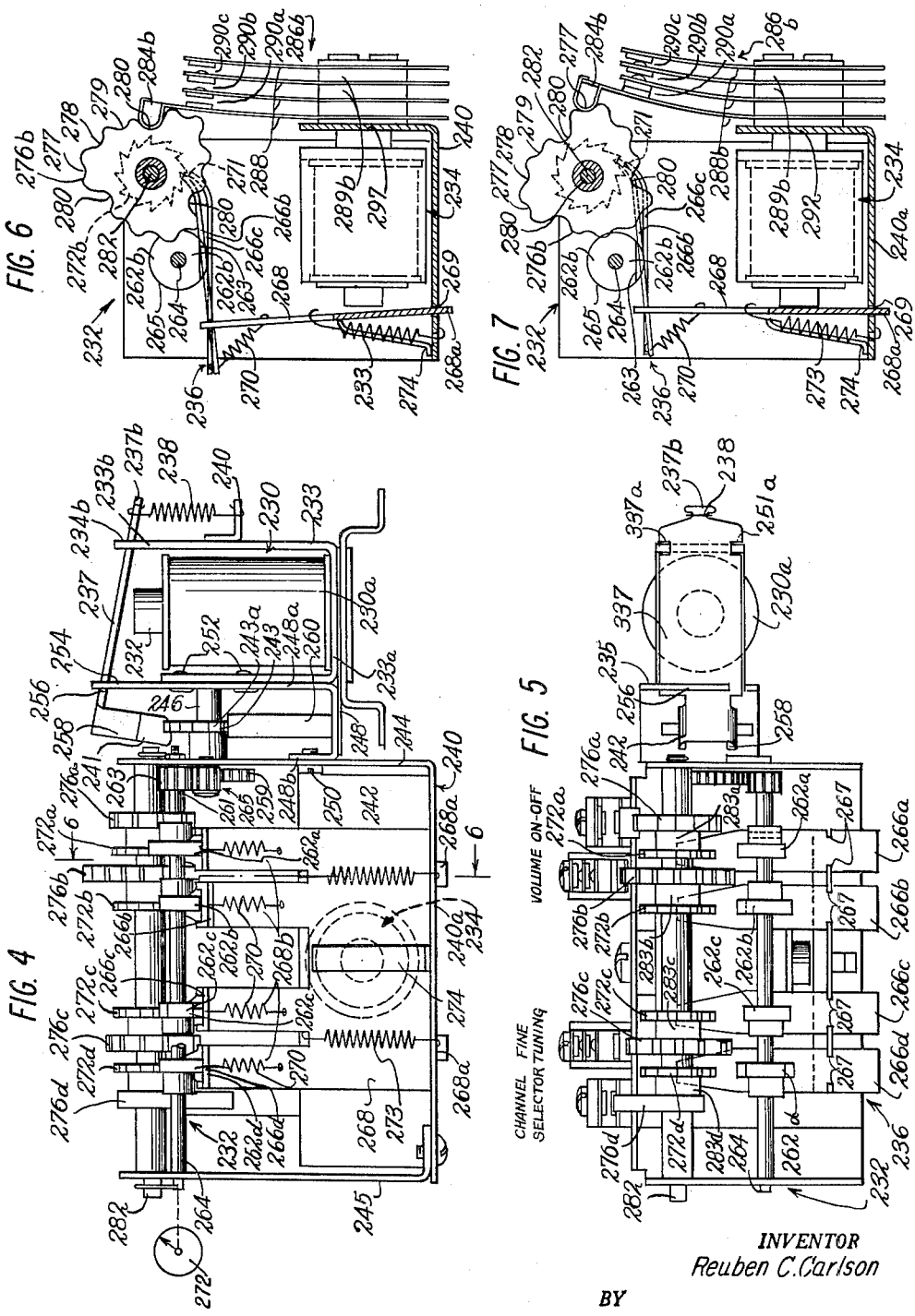
INVENTOR
Reuben C. Carlson
BY
Attys.

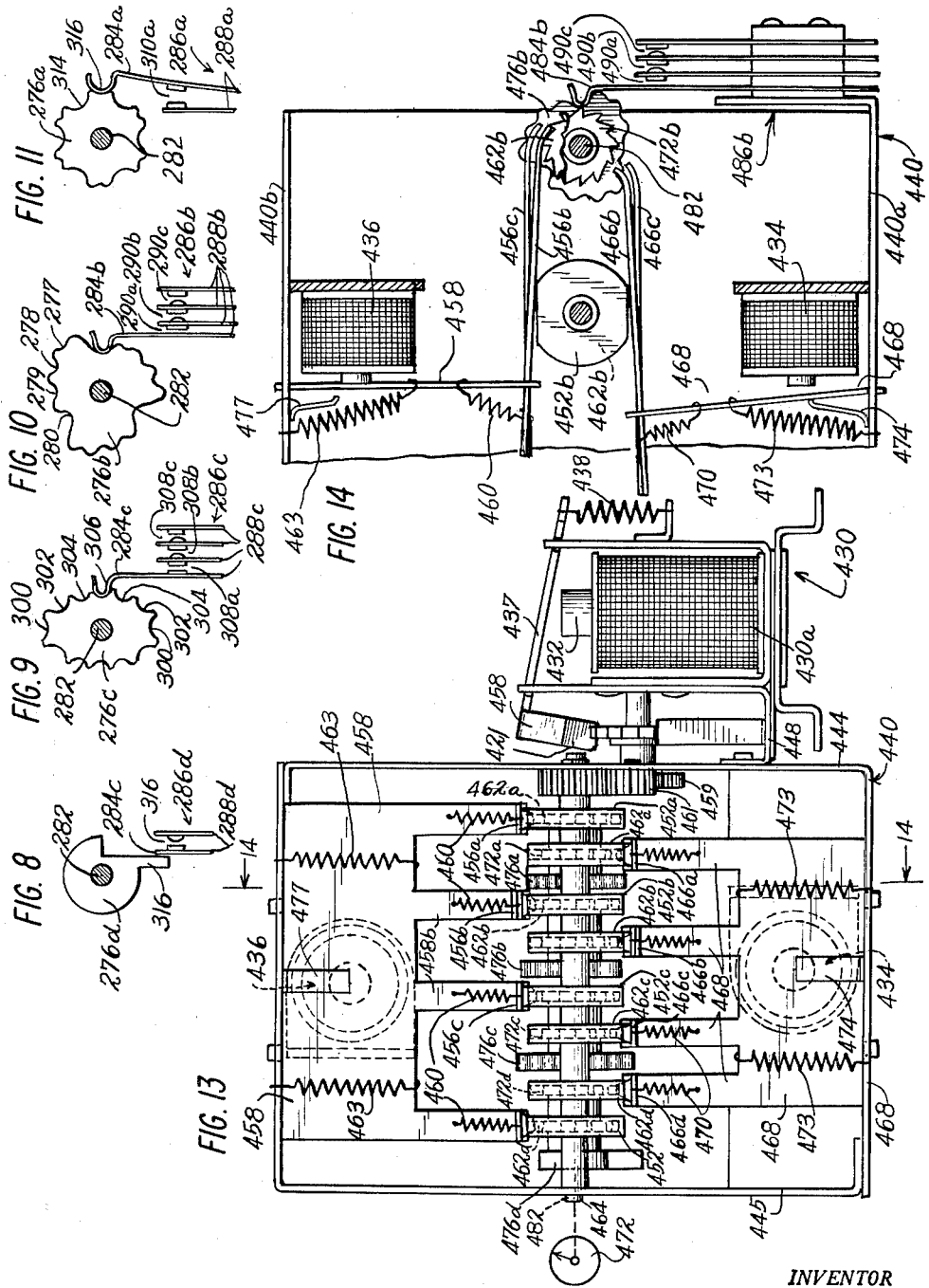

United States Patent Office 3,028,582
Patented Apr. 3, 1962

3,028,582
CONTROL SYSTEM
Reuben C. Carlson, Bensenville, Ill., assignor to Admiral Corporation, Chicago, Ill., a corporation of Delaware
Filed Apr. 24, 1959, Ser. No. 808,788
3 Claims. (Cl. 340—171)

The present invention relates to control systems for controlling the operation of electrical circuit means and, more particularly, relates to a new and improved control system operable by energy signals radiated from a remotely positioned transmitter means.

The new and improved control system has particular utility in remotely controlling selected ones of the control functions of a wave signal or the like receiver. Although the invention is described in connection with a wave signal receiver, it should not be construed as being limited or restricted to this use since the invention has a wide variety of applications in other types of electrical apparatus.

It is an object of the present invention to provide a new and improved control system for controlling an electrical circuit means.

It is another object of the present invention to provide a new and improved control system for controlling a greater number of control function means of an electrical circuit with fewer components than are employed in existing control systems.

It is a further object of the present invention to provide a new and improved remote control system wherein a selective one of a plurality of control function means in an electrical circuit is conditioned to be remotely controlled and then the selected control function means is remotely controlled to change its operative condition.

It is still a further object of the present invention to provide a new and improved control system wherein a control function means of an electrical circuit selected to be remotely controlled is identified by suitable indicating means.

It is a further object of the present invention to provide a new and improved control system in which one of a plurality of control function means is conditioned to be remotely controlled by a first energy signal radiated from a remote and mobile transmitter and the operative condition of the selected control function means is changed by a second energy signal radiated from the transmitter.

It is still another object of the present invention in accordance with the previous object to provide a control system having both electrical and electromechanical embodiments, either of which achieves the control objectives of the control system.

It is yet a further object of the present invention to provide a new and improved control system for conditioning a selected one of a plurality of control function means in an electrical circuit means to be remotely controlled, the conditioned control function means being controlled to change its operative condition in either a first or a second predetermined way.

It is another object of the present invention to provide a new and improved control system adapted to be remotely actuated by a transmitter operable to radiate distinguishable energy signals, the control system being responsive to a first of the signals to condition one of a plurality of control function means in an electrical circuit means to be remotely controlled, being responsive to a second one of the signals to change the operative condition of the conditioned control function means in a first desired manner, and being responsive to a third one of the signals to change the operative condition of the conditioned control function means in a second desired manner.

The above and other objects are realized in accordance with the present invention by providing for an electrical circuit means a new and improved remote control system comprising a control system adapted to be actuated by energy signals radiated from a transmitter. The transmitter is of the mobile or portable type and is adapted to be manually operated to produce distinguishable energy signals. The control system is responsive to a first energy signal radiated by the transmitter to condition one of a plurality of control function means in the electric circuit means to be remotely controlled by the transmitter. Since the control system has particular application in connection with a wave signal receiver, any of the following control functions, for example, can be successively conditioned for remote control by successive transmission of the first energy signals: on-off, volume, fine tuning, brightness, contrast, or channel selection. Once the desired control function is selected, a second energy signal is radiated from the transmitter to cause the control system to effect a change in the operative condition of the selected control function. For example, if the selected control function is volume, the sound level of the wave signal receiver can be changed to any one of a plurality of values by successive transmission of the second energy signals. The control system further includes suitable indicating means that inform the operator of the transmitter of the particular control function which is conditioned to be remotely controlled.

In a modified form of the present invention, the control system is responsive to a third energy signal transmitted by the transmitter to change the operative condition of the selected control function means in a manner opposite to that obtained by a second energy signal. Thus, if the second energy signal effects an increase in the sound level of the wave signal receiver, the third energy signal effects a decrease in the sound level of the receiver, thereby permitting the sound level to be changed from a medium value directly to a low value instead of from a medium value to a high level, an off level, and then to the low level.

The invention, both as to its organization and method of operation, taken with further objects and advantages thereof, will best be understood by reference to the following description taken in connection with the accompanying drawings, in which:

FIG. 1 is a diagrammatic view of an electrical embodiment of the remote control system embodying the principles of the present invention;

FIG. 2 is a schematic view of the remote control system of FIG. 1;

FIG. 3 is a diagrammatic view of an electromechanical embodiment of the present invention;

FIG. 4 is a front elevational view of a portion of the embodiment shown in FIG. 3;

FIG. 5 is a top plan view of a portion of the embodiment shown in FIG. 3;

FIGS. 6 and 7 are sectional views taken along line 6—6 of FIG. 4, illustrating the embodiment of FIG. 3 before and after the operative condition of a selected control function means is changed;

FIGS. 8, 9, 10 and 11 are side elevational views of control cams used in the embodiment of FIG. 3;

FIG. 12 is a diagrammatic view of another electromechanical embodiment of the present invention;

FIG. 13 is a front elevational view of a portion of the embodiment shown in FIG. 12; and FIG. 14 is a sectional view taken along line 14—14 of FIG. 13.

Referring now to the drawings, three embodiments of a remote control system embodying the principles of the present invention are illustrated diagrammatically in FIG. 1, FIG. 3 and FIG. 12. For convenience in identifying the different embodiments of the remote control system, the embodiment shown in FIG. 1 is referred to hereinafter as a two-button, electrical system, the embodiment shown in FIG. 3 is referred to hereinafter as a two-button, electro-mechanical system and the embodiment shown in FIG. 12 is referred to hereinafter as a three-button, electro-mechanical system. Each of the remote control systems is used to control the operation of an electrical circuit means, for example, a wave-signal receiver and particularly a television receiver, and comprises a portable transmitter adapted to generate energy signals and a control system operable in response to the transmitter signals. Briefly, each control system is responsive to a first energy signal radiated by the transmitter to condition a selected one of a plurality of control function means of the television receiver to be remotely controlled by a second energy signal radiated from the transmitter. The second energy signal causes the control system to effect a change in the operative condition of the selected control function means.

Considering now briefly the embodiment of the present invention illustrated in FIG. 1, a conventional television receiver 20 is illustrated in block form as an example of the type of electrical circuit means that can be controlled by a remote control system 22 comprising a control system 23 actuable by a remotely positioned transmitter 24. The conventional television receiver 10 has, as is well known, many control functions, such as, for example, on-off, volume, fine tuning, brightness, contrast, and channel selection, each of which is manually controllable at the television receiver 10. Moreover, certain ones of these control functions are individually controlled by remote control systems in use today. However, unlike the present-day remote control systems which are responsive to distinguishable energy signals for individually controlling corresponding control functions, the remote control system 22 uses only successively radiated first energy signals to condition a selected one of the control functions of the television receiver to be remotely controlled and uses only successively radiated second energy signals to effect a desired change in the operating condition of the selected control function. The transmitter 24, per se, is a conventional acoustical transmitter which is manually operable to develop two distinguishable energy signals, hereinafter referred to as ultra-sonic signals, of predetermined magnitude and frequency. The ultra-sonic signals are individually and independently radiated by the transmitter 24 and are detected by the control system 23 which is preferably located adjacent to the television receiver. In fact, the control system 23 is ideally supported from the chassis of the television receiver 20 so that it is enclosed within the television cabinet to be out of view of an observer of the receiver 20. The control system 22 comprises an in-put circuit including a microphone 26 for converting a first ultra-sonic signal into an electrical signal having a frequency corresponding to the frequency of first ultra-sonic signal. The electrical signal is coupled to a two-frequency selective amplifier network 28 including amplifier and discriminator circuits. The discriminator circuit causes a conductor 29 to be energized to effect the operation of a function selector relay 30. The function selector relay 30 controls a selector 32 which functions to condition one of the on-off relays 34, the volume control relay 36, the fine tuning control relay 38, or the channel selector relay 40 for remote operation. As shown, the relays 34, 36, 38 and 40 respectively control an on-off circuit 35, a volume control circuit 37, a fine tuning circuit 39, and a channel selector circuit 41, each of which is associated with the television receiver circuit. Specifically, the selector 32 sequentially interconnects the relays 34, 36, 38 and 40 to the amplifier network 28 in response to repetitively transmitted, first ultra-sonic signals. Accordingly, after a desired control function of the television receiver 20 is selected to be remotely controlled, for example, the volume control, the transmitter 24 is manually operated to radiate the second ultra-sonic signal which is detected and converted by the microphone 26 into a second electrical signal. This second electrical signal is fed to the amplifier network 28 wherein the discriminator circuit causes a conductor 31 to be energized to effect the operation of the selected volume control relay 36 through the selector 32, with the result that the volume control circuit 37 is altered thereby to change the operative condition of the volume control function. Second ultra-sonic signals are successively radiated to repeatedly operate the volume control relay 36 until the desired operative condition or sound level of the volume control function is obtained. If it is desired to adjust another control function of the receiver 20, for example, to change the station or channel to which the receiver 20 is tuned, the transmitter 24 is repetitively operated to successively transmit first ultra-sonic signals until the function selector relay 30 causes the selector 32 to condition the channel selector relay 40 for remote operation, i.e., connect the relay 40 to the amplifier network 28. Then the transmitter 24 is repetitively operated to transmit second ultra-sonic signals until the channel selector relay 40 causes the desired channel to be selected by the channel selector circuit 41.

Considering now in greater detail the television receiver controlled by the remote control system 22 and referring to FIG. 2, it includes an antenna 42 coupled to a receiving circuit 44 which includes the usual radio frequency amplifier section, station selector section, fine tuning section, first detector section, intermediate frequency amplifier section and a second detector section. As shown, the second detector section of the receiving circuit 44 is coupled to a video amplifier circuit 46, an audio circuit 48, and sweep system circuit 50. The output of the video amplifier circuit is coupled to an electronic gun embodied in cathode ray tube 52, while the output of the sweep system circuit 50 is coupled to a deflection yoke of the cathode ray tube 52 illustrated schematically by coils 54. The output of the audio circuit 48 is coupled directly to a conventional loud speaker 56. All of the above-described operating circuits of the television receiver 20 are powered by a receiver power source 58 which is energized from an ordinary 115-volt, 60-cycle source, indicated by a power inlet plug 60. In order to permit the receiver 20 to be remotely tuned to a different channel, as described in greater detail hereinafter, a tuner motor 62 is drivingly connected to the station selector section of the receiving circuit 44. Since the construction and operation of the television receiver 20 is well known and comprises no part of the present invention, a description of its operation is not included herein.

The construction and operation of the two-button, electrical system of FIG. 1 will now be described in detail. The transmitter 24, as suggested above, is of the acoustic resonator type and comprises a pair of resonator rods 70 and 72 which are suitably supported from the casing 74 of the transmitter 24. Each of these resonator rods 70, 72 is adapted to be shock-excited by a suitable manually operable hammer, or the like (not shown), to produce an ultra-sonic signal having a frequency corresponding to the length of the rod. In a transmitter used with a control system constructed in accordance with the principles of the present invention, the frequency of the ultra-sonic signal radiated by the resonator rod 70 is 38.285 kc. while the frequency of the ultra-sonic signal radiated by the resonator rod 72 is 39.285 kc. Neither of these ultra-sonic signals has a constant amplitude but they have an amplitude that exponentially decreases as time progresses. As indicated, the resonator bar 70 is manually operated to cause the control system 22 to select a particular control function in the television receiver 20 to be remotely controlled. Specifically, and as identified in FIG. 2, the resonator 70 serves to select one of the following control functions: the on-off, volume, fine tuning, or the channel selection. Then repeated striking of the resonator 70 by the manually operable hammer (not shown) sequentially conditions the on-off, volume, fine tuning, and channel selector control functions to be remotely controlled by the resonator 72, identified in FIG. 2 as a selective condition resonator. The ultra-sonic signal radiated by the resonator rod 72 causes the control system 23 to change the operating condition of the selected control function and in response to repeated striking of the rod 72 by the manually operable hammer a desired operating condition for the selected control function is obtained.

Assuming that the remote control system has conditioned the "on-off" control function of the receiver 20 for remote operation and it is desired to change the operative condition of the "volume" control function i.e., to change the sound level of the receiver 20, the hammer associated with the selector resonator 70 is actuated to radiate the first ultra-sonic signal. This signal is detected by the microphone 26 embodied in the in-put circuit of contol system 23 and its mechanical energy is converted into a first electrical signal having the same frequency as the ultra-sonic signal, i.e., 38.285 kc. This A.C. electrical signal is coupled to the two-frequency selective amplifier network 28 and, particularly, to an amplifier 76 which merely amplifies the output signal of the microphone 26. The amplified electrical signal developed by the amplifier 76 is fed into a discriminator 78 wherein the A.C. electrical signal causes a D.C. pulse to be supplied to conductor 29. The conductor 29 is electrically connected to the grid of a negatively biased, control tube 79 which is rendered conductive by the D.C. pulse. The plate circuit of the tube 79 includes a control winding 30a of the function selector relay 30 so that incident to conduction of the tube 79 current flows through the winding 30a to operate the selector relay 30, the circuit being from B-plus, winding 30a, the tube 79 and ground.

The function selector relay 30 is conventional and embodies an armature 80 having a pawl 82a adapted to engage and step a ratchet wheel 82 when the relay 30 is energized. The ratchet wheel 82 is mechanically connected to a pair of switch wipers 84 and 86 which respectively coact with selected ones of contacts 85 and 87 mounted respectively on stators 83 and 89, the wheel 82 and wipers 84 and 86 comprising the selector 32. The ratchet wheel 82 and the wipers 84 and 86 are adapted to be stepped into twelve operative positions so that the wipers 84 and 86 successively engage the contacts 85 and 87, respectively, comprising twelve spaced contact elements. In order to simplify the drawing, only two sets of four contacts 85a, 85b, 85c and 85d and 87a, 87b, 87c and 87d are illustrated, since actually every fourth contact element of the stators 83 and 89 are connected together to provide, in effect, four contact positions for the switches. In any event, as a result of the operation of the selector relay 30, the wiper 84 is moved out of engagement with the contact 85a into engagement with the contact 85b, while the wiper 86 is moved out of engagement with the contact 87a into engagement with the contact 87b.

The engagement of the wiper 86 with the contact 87b under the control of the selector relay 30 conditions the volume control relay 36 to be remotely controlled and specifically completes the following circuit shown in FIG. 2: ground, a normally non-conductive tube 81, conductor 100, wiper 86, contact 87b, conductor 102, relay winding 36a, a common conductor 104, and B-plus. It will be appreciated that repeated operation of the relay 30 in response to successively transmitted, first ultra-sonic signals causes the wiper 86 to sequentially engage the contacts 87c, 87d, 87a and 87b, thereby to sequentially condition the fine tuning relay 38, the channel selector relay 40, the on-off relay 32, and the volume control relay 36 for remote operation. It should be emphasized that the function selector relay 30 itself does not operate or energize any of the above relays 34, 36, 38 or 40, but merely completes for the respective relay windings individual circuits including a normally non-conductive control tube 81 which is negatively biased similar to control tube 79. Since the grid of the control tube 81 is electrically connected to the conductor 31 and, then, is supplied with D.C. pulses only in response to transmission of the second ultra-sonic signals, the tube 81 remains non-conductive and the relays 34, 36, 38 or 40 selectively connected to the tube 81 remain inoperative, while the selector relay 30 is repeatedly operated by the first ultra-sonic signals.

The wiper 84 and contacts 85 coact to control an indicating means 89 which selectively identifies the control function of the receiver 20 that is conditioned to be remotely operated. The indicating means 89 is preferably located in the front of the television receiver 20 so that the operator of the transmitter 24 is informed of the condition of the control system 23 at all times. In this connection, the indicating means 89 comprises a generally translucent plate 90 seated over a recessed portion provided in the front of the cabinet of the receiver 20, the plate being divided into separate windows 90a, 90b, 90c and 90d which are respectively marked "on-off," "volume," "fine tuning," and "channel selection." These windows 90a, 90b, 90c, 90d, are selectively illuminated under the control of the wiper 84 by lamps 92a, 92b, 92c and 92d suitably supported from the recessed portion of the cabinet.

As the wiper 84 moves from contact 85a to contact 85b under the control of the relay 32, the "on-off" window 90a is darkened and the "volume control" window 90b is illuminated. Specifically, an energizing circuit for the bulb 92b is completed from a 6-volt, A.C. source preferably supplied by the power source 58 of the television receiver 20, a conductor 94, the bulb 92b, a conductor 95, contact 85b, wiper 84 and a conductor 96 connected to the 6-volt A.C. source. It will be understood that as the fine tuning relay 38, channel selector relay 40, on-off relay 34, and volume control relay 36 are sequentially conditioned for remote operation, the fine tuning window 90c, channel selector window 90b, on-off window 90a, and volume control window 90b are sequentially illuminated for visually indicating the selected receiver control function.

After the volume control function is selected, the operating condition of the volume control function, i.e., the sound level of the television receiver 20, is changed by operating the transmitter 24. Particularly, the hammer associated with the selective condition resonator rod 72 is manually actuated to cause the rod 72 to radiate the second ultra-sonic signal. This signal is detected by the microphone 26 and is converted into an electrical signal having the same frequency as the ultra-sonic signal. The output of the microphone 26 is coupled to the amplifier 76 where the electrical signal is amplified and is fed into the discriminator 78. The discriminator 78 in response to the electrical signal applies a D.C. pulse to the conductor 31 and, thus, the grid of the control tube 81. Accordingly, the negatively-biased tube 81 is rendered conductive, with the result that the energizing circuit for the volume control relay 36 is completed so that current flows through the winding 36a to energize the relay 36.

The relay 36, including its winding 36a and its armature 106, controls the volume control circuit 37 which comprises a ratchet wheel 108 connected to a switch 109 operable to connect selective ones of impedances 118 to the receiver circuit. More specifically, the energized relay 36 causes its armature 106 including a pawl 106a to engage and step the ratchet wheel 108. The ratchet wheel 108 is mechanically connected to a wiper 110 of the switch 109, which wiper 110 is moved under the control of the ratchet wheel 108 into twelve operative positions to selectively engage a plurality of contacts, referred to collectively as 112. However, since every fourth contact element is connected together to provide a four-position switch, only four contacts 112a, 112b, 112c and 112d are illustrated in order to simplify the drawing.

The wiper 110 is operable under the control of the volume control relay 36, in response to successively transmitted second ultra-sonic signals, to change the sound level of the loud speaker 56 in the television receiver 20. To this end, the wiper 110 selectively connects certain ones of the impedances, illustrated as resistors 118, across conductors 114 and 116. These conductors 114 and 116 are connected to the ends of the voice coil (not shown) of the speaker 56 so that the resistors are shunted across the voice coil of the speaker 56.

Assuming that incident to operation of the relay 36 the wiper 110 is moved by the ratchet wheel 108 from engagement with contact 112a into engagement with contact 112b, as shown in FIG. 2, the resistor 118a is disconnected from the voice coil and the resistor 118b is shunted across the voice coil. Since the resistors 118a, 118b, 118c, and 118d have progressively higher resistance values, the resistor 118b has a larger resistance than resistor 118a, with the result that a greater amount of the current produced by the audio circuits 48 flows through the voice coil thereby increasing the level of the sound produced by the speaker 56.

The resistors 118a, 118b, 118c and 118d produce, respectively, a mute or off condition, a low volume condition, a medium volume condition, and a high volume condition. Thus, it will be appreciated that these conditions are successively obtained as the wiper 110 sequentially engages the contacts 112a, 112b, 112c, and 112d in response to successive operations of the volume control relay 36 caused by the repeated transmission of the second ultra-sonic signals. Accordingly, if it is desired to listen to the receiver 20 at a medium volume when the receiver is set at the mute or off condition, the transmitter is operated twice to produce two of the second ultra-sonic signals. These signals cause the volume relay to operate twice so that the wiper 110 is moved from engagement with the contact 112a into engagement with contact 112c, whereby resistor 118c is connected in shunt across the speaker voice coil. Since the resistor 118c has a higher resistance value than resistor 118b, even more current flows through the voice coil with the result that a higher level of sound is produced than when the resistor 118b is shunted across the coil. If even a higher level of sound is desired, another second ultra-sonic signal is transmitted by the transmitter 24 and the above-described operation is repeated to shunt resistor 118d across the speaker voice coil, whereby yet more current flows through the voice coil to produce yet a higher level of sound. In response to the transmission of still another second ultra-sonic signal, the low value resistor 118a is shunted across the voice coil to effectively short circuit the voice coil, thereby to produce a barely audible level of sound.

If it is desired to control the fine tuning of the television receiver 20 when the volume control function is conditioned to be remotely controlled, the selector resonator rod 70 in the transmitter 24 is manually actuated to radiate a first ultra-sonic signal. The ultra-sonic signal causes the function selector relay 30 to operate, with the result that the ratchet wheel 82 is stepped and the wipers 84 and 86 are moved from engagement with contacts 85b and 87b as illustrated in FIG. 2, into engagement with the contacts 85c and 87c, respectively. The movement of the wipers 84 causes the volume control window 90b to be darkened and the fine tuning window 90c to be illuminated. Specifically, the disengagement of the wiper 84 with the contact 85b open circuits the above-described energization circuit for the bulb 92b, while the engagement of the wiper 84 with the contact 85c completes an energizing circuit for the bulb 92c, as follows: the 6-volt A.C. source, conductor 94, bulb 92c, conductor 93, contact 85c, wiper 84, and the conductor 96 which is connected to the 6-volt source.

The movement of the wiper 86 causes the energization circuit for the volume control relay 36 to be open-circuited and an energization circuit for the fine tuning relay 38 to be conditioned for operation. Particularly, engagement of the wiper 86 with the stationary contact 87c electrically connects the winding 38a of the fine tuning relay 38 to the normally nonconducting tube 81, and establishing the following circuit: ground, the tube 81, the conductor 100, the wiper 86, the contact 87c, conductor 103, the relay winding 38a, the common conductor 104, and B-plus. As stated hereinabove, the function selector relay 30 does not operate the fine tuning relay 38, but merely places the relay 38 under the control of the negatively-biased tube 81.

Once the desired fine tuning control function has been selected by the selector resonator rod 70, the selective condition resonator rod 72 is actuated to radiate a second ultra-sonic signal. This ultra-sonic signal, detected by the microphone 26, causes a D.C. pulse to be applied to the grid of the tube 81, thereby rendering the tube 81 conductive. Accordingly, the energization circuit for the relay 38 is completed, whereby current flows through the winding 38a to energize the relay 38. The relay 38, including its winding 38a and armature 120, control the fine tuning circuit 39 which comprises a ratchet wheel 122 connected to a switch 123 operable to connect selected ones of impedances 128 to the receiver circuit. More specifically, the energized relay 38 causes its associated armature 120 including a pawl 120a to engage and step the ratchet wheel 122. The ratchet wheel 122 is mechanically connected to a wiper 124 of the switch 123, which wiper 124 moves under the control of the ratchet wheel 122 into twelve operative positions to selectively engage a plurality of contacts, referred to collectively as 126. To simplify the description, only four contacts 126a, 126b, 126c and 126d are illustrated, since although twelve contacts are provided in the switch, every fourth contact is electrically connected together to provide a four-position switch.

The wiper 124 is operable under the control of the fine tuning relay 38, in response to successively transmitted second ultra-sonic signals, to change the fine tuning of the receiver 20. To this end, the wiper 124 selectively connects certain ones of the impedances, illustrated as resistors 128, to conductors 132 and 134 which are connected to the fine tuning section of the receiving circuits 44 of the television receiver 20. Assuming that incident to the operation of the relay 38 the wiper 124 is moved by the ratchet wheel 22 from engagement with contact 126a into engagement with contact 126b, as shown in FIG. 2, the resistors 128b, 128c and 128d are connected to the conductors 132 and 134 instead of resistors 128a, 128b, 128c and 128d previously connected to the conductors 132 and 134. Accordingly, the control resistance offered to the fine tuning section of the receiving circuits 44 is reduced, thereby effecting a change in the fine tuning condition of the receiver 20. The fine tuning can be further varied by operating the transmitter to radiate one or more second ultra-sonic signals, whereby the wiper 124 is stepped to further change the amount of resistance offered to the fine tuning section of the receiving circuits 44. In short, the selective resonator rod 72 of the transmitter 24 is successively operated until an optimum amount of resistance is offered to the fine tuning section to obtain an optimum fine tuning condition.

If it is desired to change the channel to which the television receiver 20 is tuned, when the volume control function (not the fine tuning control function) is conditioned to be remotely controlled, the selector resonator rod 70 is actuated twice to radiate two of the first ultrasonic signals. The two successively radiated signals cause the function selector relay 30 to operate twice, with the result that the ratchet wheel 82 is stepped twice so that the wipers 84 and 86 are moved from engagement with the contacts 85b and 87b, respectively, as illustrated in FIG. 2, into engagement with the contacts 85d and 87d. The movement of the wiper 84 causes the volume control window 90b to be darkened, the fine tuning window 90c to be momentarily illuminated, and the channel selection window 90d to be illuminated. Specifically, the disengagement of the wiper 85 with the contact 85b open-circuits the above-described energization circuit for the bulb 92b, while the engagement of the wiper 84 with the contact 85d completes an energizing circuit for the bulb 92d, as follows: the 6-volt A.C. source, conductor 94, bulb 92d, conductor 97, contact 85d, wiper 84, and conductor 96 which is connected to the 6-volt A.C. source. The movement of the wiper 86 causes the energization circuit for the volume control relay 36 to be open-circuited and an energization circuit for the channel selector relay 40 to be conditioned for operation. Specifically, the engagement of the wiper 86 with the contact 87d electrically connects the winding 40a of the channel selector relay 40 to the normally non-conducting tube 81 and establishes the following circuit: ground, tube 81, conductor 100, wiper 86, contact 87d, conductor 105, relay winding 40a, conductor 104, and B-plus.

After the channel selector control function is selected, the channel of the television receiver 20 is changed by actuating the selected condition resonator 72 to radiate a second ultra-sonic signal. The signal, as described above, causes a positive pulse to be applied to the grid of the tube 81, thereby rendering the tube 81 conductive to effect the operation of the relay 40. The relay 40, including its winding 40a and its armature, controls the channel selector circuit 41 which comprises a switch including contacts 136, a programming mechanism 141 controlled by the contacts 136, and the tuner motor 62 operated under the control of the mechanism 141. The energized relay 40 causes its armature to close the pair of contacts 136 which are electrically connected by conductors 137 and 138 to the programming mechanism 141. The mechanism 141, the tuner motor 62, and the main tuning shaft in the receiving circuits 44 are drivingly connected together, while the motor 62 is energized by the mechanism 141 by conductors 140 and 142. As a result of the closure of the contacts 136, the mechanism 141 operates independently of the contacts 136 to energize and deenergize the tuner motor 62 so that the main tuning shaft is moved from one channel position to an adjacent, higher channel position. Thus, instead of a relay stepping an associated ratchet and switch wiper, as described above, the relay 40 operates the programming mechanism 141 which itself exclusively controls the movement of the tuner motor 62, and hence, the main tuning shaft. As described above, successively transmitted, second ultra-sonic signals cause the channel selector relay 40 to be repeatedly operated, thereby to successively operate the programming mechanism 141 so that the main tuning shaft is stepped into successive channel positions. It should be understood that a second ultra-sonic signal generated during the operation of the programming mechanism 141 has no effect on channel selection, since the relay 40 is energized and deenergized by the time the programming mechanism 141 concludes its operation. Accordingly, the successively transmitted, second ultra-sonic signals must be individually transmitted after the programming mechanism 141 moves the main tuning shaft to its adjacent channel position.

If it is desired to turn the television receiver 20 on or off when the channel selector control function is conditioned to be remotely controlled, the selector resonator rod 70 is actuated to radiate a first ultra-sonic signal. As described above, the first ultra-sonic signal causes the function selector relay 30 to operate, with the result that the ratchet wheel 82 is stepped and the wipers 84 and 86 are moved from engagement with the contacts 85d and 97d, respectively, into engagement with the contacts 85a and 87a, respectively. The movement of the wiper 84 causes the channel selection window 90d to be darkened and the on-off window 90a to be illuminated. Specifically, the disengagement of the wiper 84 with the contacts 85d open-circuits the above-described energization circuit for the bulb 92d while the engagement of the wiper 84 with the contact 85a completes an energization circuit for the bulb 92a, as follows: the 6-volt A.C. source, conductor 94, bulb 92a, conductor 91, contact 85a, wiper 84, and conductor 96 connected to the 6-volt A.C. source. The movement of the wiper 86 causes the energization circuit for the volume control relay 40 to be open-circuited and an energization circuit for the on-off relay 34 to be conditioned for operation. Specifically, the engagement of the wiper 86 with the contact 87a electrically connects the winding 34a of the on-off relay 34 to the normally non-conductive tube 81 and establishes the following circuit: ground, tube 81, conductor 100, wiper 86, contact 87a, conductor 107, winding 34a, the common conductor 104, and B-plus.

With the on-off relay conditioned for remote operation and assuming that the receiver is turned on, the selective condition resonator rod 72 is actuated to produce a second ultra-sonic signal for detection by the control system 23. The second ultra-sonic signal renders the tube 81 conductive and the on-off relay 31 operative. The relay 34, including its winding 34a and its armature, controls an on-off circuit 35 comprising a cam 146, which is rotated 90° each time the relay 34 is operated, to open and close a pair of contacts 148 electrically connected to the receiver circuit. The energized relay 34 causes its armature to move the cam 146 from the position illustrated in FIG. 1 into a position displaced 90° clockwise to open a pair of contacts 148. The contacts 148 are effectively located by a pair of conductors 150 and 152 in one of the conductors of the power plug 60 which supplies power to the power source 58. Accordingly, when the contacts 148 are open, the power to the power source 58 is cut off and, thus, the power supplied by the power source 58 to the receiving circuits 44, video amplifier circuits 46, audio circuits 48, and sweep system circuits 50 is likewise cut off, thereby turning off the television set.

However, if it is desired to turn the set on again, the selector condition resonator rod 72 is actuated to radiate a second ultra-sonic signal. The signal, as described above, causes the on-off relay 34 to operate with the result that the cam 146 is rotated 90° to permit the contacts 148 to close. The closure of the contacts 148 causes the power source 58 to be electrically connected with the plug 60 so that the above circuits in the television receiver 20 are again supplied with power.

It should be understood that, although only four control functions, i.e., on-off, volume, fine tuning, and channel selection have been illustrated and described in detail, other functions of the receiver 20 can also be controlled by the remote control system 22. For example, a brightness function and a contrast function could be remotely controlled in the same manner as described above. Furthermore, a record player apparatus embodied in a console television set could also be controlled by the remote control system 22. In this connection, assuming that a brightness and a contrast control function are also to be remotely controlled by the remote control system 22, the twelve-position stepping relay 30 and, specifically, the two sets of twelve contacts 85 and 87 are so connected that every sixth contact element is electrically connected together to provide a six-position switch. Thus, the relay 30 can be used to control six relays instead of the four illustrated and described, the six relays being an on-off relay, a volume control relay, a fine tuning control relay, a channel selector relay, a brightness control relay and a contrast control relay. It will be appreciated that similar to the volume control and fine tuning relays, the brightness control and contrast control relays can control suitable impedances electrically associated with the television receiver circuit. Thus, from the foregoing description, it should be apparent that any one of the above six functions, or for that matter any number of the television receiver functions, can be remotely controlled by the above-described remote control system. Furthermore, all of the control functions, irrespective of their number, are remotely controlled by the transmitter 24 and, in particular, by only its two resonator rods 70 and 72.

Another feature of the control system is that the system has greater noise immunity than other systems that control the same number of control functions. Specifically, the range of spurious signals that can inadvertently operate the receiver is substantially reduced since with two resonator rods instead of four, five or six rods, the band width of the spurious signals is only 1000 cycles as contrasted with a band width of 3000, 4000 or 5000 cycles. Moreover, the remote control system is entirely immune to the spurious signals that will operate other similar remote control systems embodying more than two resonator rods.

Referring now to the two-button electro-mechanical embodiment of the present invention illustrated in FIGS. 3 through 11, attention is directed to FIG. 3 in which the control system is illustrated diagrammatically and is generally identified by reference numeral 222. The remote control system 222, similar to the above-described remote control system 22, includes a portable transmitter 224 adapted to transmit ultra-sonic signals to a control system 223. The transmitter 224 is identical in construction and operation to the previously described transmitter 24 and functions to radiate first and second ultra-sonic signals having the same frequencies as the signals generated by transmitter 24, i.e., 38.285 kc. and 39.285 kc. The control system 223 includes a microphone 226 which converts the ultra-sonic signals into electrical signals having the same frequencies as the ultra-sonic signals. The electrical signals are fed into a two-frequency selective amplifier network 228, identical to the previously described amplifier network 28. Incident to transmission of the first ultra-sonic signal by the transmitter 224, the function selector relay 230, similar to the function selector relay 30, is operated to control a mechanical function selector 232. The mechanical function selector 232 mechanically conditions a mechanical condition selector 236 for a predetermined type of operation, i.e., it determines which one of the control functions of the receiver 220 is to be controlled when a condition selective relay 234 is operated in response to the transmission of a second ultra-sonic signal from the transmitter 224. The mechanical condition selector 236 is operatively connected to the on-off, volume control, fine tuning and channel selector circuits 425, 426, 427, and 428 associated with the television receiver circuit and hence causes a change in the operative condition of the respective control function. Accordingly, depending upon the position of the mechanical function selector 232 set by the repetitively transmitted, first ultra-sonic signals, a selected one of the on-off, volume control, fine tuning, and channel selector circuits 425, 426, 427 and 428, is controlled in response to repetitive transmission of the second ultra-sonic signals to change the operative condition of the selected control function.

The constructional details of a portion of the control system 223 of the two-button electro-mechanical embodiments are illustrated in FIGS. 4 through 11. Also, not illustrated in detail in FIGS. 4 through 11, is the transmitter 224, and a portion of the control system 223 including the two-frequency selective amplifier network 228, which is identical with the above-described selective amplifier network 28, and a part of the circuits 425, 426, 427, and 428, similar to corresponding parts of the circuits 35, 37, 39, and 41. As above, the network 228 includes an amplifier, similar to amplifier 76, for amplifying the electrical signals produced by a microphone, similar to microphone 26. The signals are coupled to a discriminator, similar to the discriminator 78, for producing D.C. pulses on the grids of normally non-conductive tubes, similar to tubes 79 and 81, respectively. To facilitate the description, these tubes will be referred to hereafter as tubes 79 and 81.

As illustrated, the components of the electro-mechanical embodiment 223 are individually supported from a generally U-shaped casing 240, the web 240a of the casing 240 having a generally upstanding relay mounting plate 242 along its rearward edge. The function selector relay 230 is supported from the right wall 244 of the casing 240, as viewed in FIG. 4, by a J-shaped bracket 248 and U-shaped magnetic structure 233, which are suitably secured together. The relay 230 includes a winding 230a serially connected in the plate circuit of the control tube 79. Accordingly, similar to the relay 32, the relay 232 operates in response to the transmission of the first ultrasonic signals. The winding 230a is wound around a cylindrical magnetic core 232 suitably supported from the web portion 233a of the U-shaped magnetic structure 233. The right leg 233b of the structure 233 includes a recessed portion 235 at its upper end to accommodate a pair of keyways 237a defined transversely in an armature plate 237 (see FIG. 5). The armature plate 237 is biased into an inoperative position, illustrated in FIGS. 4 and 5, by a coiled spring 238 which is interconnected between the reduced right end 237b of the armature 237 and an angulated hook 240 suitably secured to the leg 233b. As shown, the left portion of the armature 237 is located within an opening 254 in the upper portion of the long leg 248a of the J-shaped bracket 248 and is urged by the coiled spring 238 into abutting engagement with the upper end portion 256 of the leg 248a.

The armature 237 is moved from its inoperative position, illustrated in FIG. 4, to a generally horizontal operative position (not shown) by the relay 232 operated incident to the transmission of the first ultra-sonic signal. During this movement, a pawl 241 depending from the left end of the armature 237 engages and steps a ratchet wheel 243. To prevent the ratchet wheel 243 from moving more than one operative position, a stop 258 likewise depends from the left end of the armature plate 237 to coact with the uppermost ratchet 243a of the ratchet wheel 243, the stop 258, as shown in FIG. 4 being substantially shorter than and parallel to the pawl 241 so that the stop 258 engages the ratchet wheel 243 after it has been turned one operative position by the pawl 241. In addition, the ratchet wheel 243 is prevented from moving in a direction reverse to that in which it moved under the control of the relay 230 by a single leaf spring 260 suitably secured to the web of the J-shaped bracket 248, which leaf spring 260 permits movement of the ratchets 243a in one direction and obstructs movement in the opposite direction. The ratchet wheel 243 is mounted on a shaft 246 which is journaled between the long leg 248a of the J-shaped bracket 248 and the casing wall 244, the short leg 248b of the bracket 248 being secured to the casing wall 244 by suitable fasteners 250. As shown, the long leg 248a of the J-shaped bracket 248 is physically connected to and entirely supports the U-shaped armature structure 233 by suitable fasteners 252.

As briefly discussed above, the function selector relay 230 is mechanically connected to a mechanical function selector 232 which is operative to condition a desired control function of the receiver 20 to be remotely controlled. To this end, the ratchet wheel 243 drives a control shaft 264 through a gear train 265, the control shaft 264 being journaled between the upstanding casing walls 244 and 245. The gear train 265 comprises a spur gear 259 secured to the ratchet wheel supporting shaft 246, an idler spur gear 261 suitably supported from the casing wall 244, and a spur gear 263 suitably secured to the control shaft 264. By this gearing arrangement, the control shaft 264 rotates 90° every time the ratchet wheel 243 is stepped by the selector relay 230, with the result that the control shaft 264 defines four operative 90° displaced positions.

In order to provide for mechanical selection of a desired control function, instead of an electrical selection as described in connection with the FIG. 1 embodiment, a plurality of spaced-apart cams, referred to collectively as 262, are suitably secured to the control shaft 264 to coact with a plurality of actuating fingers, referred to collectively as 266. The actuating fingers 266 actually comprise the mechanical condition selector 236 and are individually referred to as the on-off actuating finger 266a, the volume control actuating finger 266b, the fine tuning actuating finger 266c, and the channel selector actuating finger 266d. The fingers 266 are pivotally supported on the upper ends of spaced-apart arms 268b of an armature lever 268 operated by the condition selective relay 234. The armature lever 268 has a configuration best illustrated in FIG. 4, and as shown therein, includes four spaced-apart arms 268b, each of which is suitably recessed at its upper end to accommodate a pair of keyways 267 defined transversely in each finger 266. The control cams 262 under the control of the selector relay 230 function to render selectively operative the actuating fingers 266, thereby causing, incident to operation of the condition selective relay 234 and its associated armature lever 268, a change in the desired on-off, volume control, fine tuning or channel selector circuits. Specifically, as shown, the selectively operative actuating fingers 266 are adapted to coact with the circuits which comprise a plurality of interconnected ratchet wheels 272 and control cams 276, which cams 276 control switches 284 to respectively, change the condition of the on-off circuit 221, volume control circuit 222, fine tuning circuit 223, and channel selector circuit 224, thereby to effect a change in respective control function of the receiver 220.

Considering now specifically the control cams of the mechanical function selector 232, the control cams 264 are generally cylindrical and each includes a cylindrical non-camming surface 265 and a flat camming surface 263. Since the camming surfaces 263 actually are defined by removing a portion of the cams 262, the removed portions permit the actuating fingers to be pivoted about the upper ends of the armature arms 268b in a counterclockwise direction, as viewed in FIGS. 6 and 7, into operative positions under the control of coiled springs 270, the springs 270 being interconnected between the left ends of the fingers 266 and the arms 268b. In order to render the fingers 266a, 266b, 266c and 266d selectively operative the flattened camming portions 263 of the cams 262a, 262b, 262c and 262d are successively 90° related from one another, so that in response to operation of the relay 232, one of the fingers 266 is rendered operative under the control of its associated cam 262, while the balance of the fingers 266 are rendered inoperative under the control of their associated cams 262. Hence, by successively radiating first ultrasonic signals to repeatedly operate the function selector relay 230, the fingers 266a, 266b, 266c and 266d are sequentially rendered operative under the control of their associated cams 262a, 262b, 262c and 262d.

Returning now to the mechanical function selector 232, the control shaft 264 is positioned, as shown, to condition the volume control function of the television receiver 20 to be remotely controlled. As shown in FIGS. 5, 6 and 7, the flattened camming portion 263 of the cam 262b opposes the volume control actuating finger 266b to permit the coil spring 272 to urge the tip 271 of the finger 266b into cooperative relationship with ratchet wheel 272b, as shown clearly in FIG. 6. Since the camming surface 265 of the cam 262a faces rearwardly, the camming surface 265 of the cam 262c faces upwardly, and the camming surface 265 of the cam 262d faces forwardly, the cylindrical, non-camming portions 265 of these cams 262a, 262c, and 262d coact with their associated fingers 266a, 266c, and 266d to position the fingers as best shown in FIGS 6 and 7 in their inoperative positions. Specifically, the tips 271 of the fingers 266a, 266c and 266d are maintained out of cooperative relationship with their associated ratchet wheels 272a, 272c, and 272d, as shown in FIG. 6.

With the volume control function selected to the remotely controlled, the volume level of the receiver 20 is changed by operating the transmitter 224 to radiate a second ultra-sonic signal. This second ultra-sonic signal causes, as described above in connection with the two-button electrical embodiment of FIG. 1, the operation of the condition selective relay 234. The relay as illustrated in FIGS. 4, 5, 6, and 7 is suitably fastened to the upstanding casing plate 242. Incident to energization of the relay 234, the armature lever 268 moves from an inoperative position illustrated in FIG. 6 to an operative position illustrated in FIG. 7, which armature lever 268 is pivotally supported from the casing web 240a by a pair of integral legs 268a extending downwardly from the lever 268 to be received in a pair of openings 269 defined in web 240a and shown only in FIGS. 6 and 7. Prior to movement of the armature lever 268, it is biased by a spring 273 into its inoperative position in abutting engagement with a support 274 suitably secured to the casing web 248 so that the tips 274 of the fingers 266 are spaced from the ratchet wheels 272. However, since the finger 266b is in its operative position under the control of the cam 262b and the fingers 266a, 266c and 266d are in their inoperative positions under the control of the cams 262a, 262c and 262d, the tip 274 of the finger 266b is located immediately adjacent to the lowermost ratchet on the ratchet wheel 272b while the tips 274 of the fingers 266a, 266c and 266d are spaced further below the lowermost ratchets.

Therefore, as the armature lever 286 pivots to the right as viewed in FIGS. 6 and 7, the fingers 266 move substantially horizontally to the right with the result that the finger 266b engages the lowermost ratchet to step the ratchet wheel 272b. However, since the tips 274 of the fingers 266a, 266c and 266d are spaced beneath the lowermost ratchets, the ratchet wheels 272a, 272c, and 272d are not engaged and are not stepped by these fingers. The ratchet wheel 272b is locked to volume control cam 276b by a sleeve 283b, and the ratchet wheel 272b, the sleeve 276b, and the sleeve 283b being rotatably supported on a shaft 282 journaled between the casing walls 244 and 245. As shown in detail in FIG. 11, the control cam 276b has a plurality of repetitive camming portions 277, 278, 279 and 280, corresponding respectively to an off volume condition, a low volume condition, a medium volume condition, and a high volume condition. Accordingly, as a result of the movement of the armature 268, only the control cam 276b is stepped one operative position to change the operative condition of the associated volume control circuit associated with the television receiver 20.

The volume control cam 276b and particularly the camming portions 277, 278, 279 and 280 coact with a resilient cam follower 284 of a volume control switch 286b electrically connected to the volume control circuit. The control switch 286b is suitably secured to the upstanding casing plate 242 and includes contacts 290a, 290b and 290c that are adapted to be sequentially closed under the control of the resilient cam follower 284b. As shown in FIGS. 6, 7 and 11, the contacts 290a are respectively located on the cam follower 284b and on adjacent resilient support 288b and the contacts 290b and 290c are located on adjacent resilient supports 288b, while follower 284b and supports 288b are spaced apart by suitable insulating blocks 289 which are suitably secured to the upstanding casing plate 242. Although it is not shown, the conductive supports 288b are respectively connected to a plurality of resistors, so that in response to opening and closing of selected ones of the contacts 290 certain ones of the resistors are selectively connected in shunt across the voice coil of the loud speaker 56. These resistors (not shown) perform the same general function as the resistors 118a, 118b, 118c, and 118d, discussed above, and specifically control the amount of the current flow through the voice coil of the loud speaker, similar to speaker 56.

Considering now the volume control circuit and, particularly, the control cam 276b and the switch 286b, prior to the above described operation of the control relay 234, the volume control cam 276b, the cam follower 284 and the switch 286 assume the positions shown in FIG. 6 and cause the volume control circuit to provide a high volume level for the receiver 220. As shown, the cam follower 284b is in engagement with the camming portion 280 of the volume control cam 276b, and because of the coaction between the concave camming portion 280 and the convex end of the resilient cam follower 284b, the cam 276b is restrained against random movement under the control of the resilient cam follower 284b. Moreover, the resiliency of follower 284b causes it to assume the position in FIG. 6, wherein the contacts 290a, 290b, and 290c are opened to disconnect three of the four resistors from across the voice coil. Since one and not four resistors is connected across the voice coil, a maximum shunt resistance is provided so that a maximum current flows through the voice coil to provide maximum volume. When the armature lever 286 of the relay 234 moves from its position illustrated in FIG. 6 to the position illustrated in FIG. 7 in response to the second ultrasonic signal, the finger 266b is displaced rightwardly as seen in FIGS. 6 and 7, to step the ratchet 272b in a counterclockwise direction. The volume control cam 276b also turns counterclockwise to move the cam follower 284b out of engagement with the camming portion 280 and into engagement with the camming portion 277, as illustrated in FIG. 7. As shown, all of the contacts 290a, 290b and 290c are closed under the control of the cam follower 284b, thereby to shunt the three resistors (not shown) across the voice coil. With four resistors shunted across the voice coil, instead of only one resistor, the effective resistance across the coil is reduced to a minimum value and, accordingly, the current flow through the voice coil is relatively small to produce an inaudible volume level.

It will be appreciated that in response to successively radiated, second ultra-sonic signals the selective relay 234 is repeatedly operated to cause the volume control cam 276b to be repeatedly stepped in a counterclockwise direction, thereby successively opening the contacts 290c, 290b, and 290a. Consequently, as more of the shunt resistors are removed from across the voice coil, more effective shunt resistance is obtained, thereby causing the volume of the television receiver to incrementally increase.

In order to indicate the control function that is conditioned for operation, suitable indicating means, similar to the above described indicating means 89 are employed in the control system 223. The indicating means are not illustrated, since they are identical to the indicating means 89 previously described in detail and illustrated in FIG. 2, with the exception that the wiper of control switch 272 is driven by the control shaft 264 instead of the ratchet wheel 82. Accordingly, when the control shaft 264 sequentially moves into its 90° displaced positions, wherein the fingers 266 are sequentially rendered operative, electrical circuits are completed through the switch 272 to sequentially illuminate suitable bulbs positioned behind a translucent window located in the front of the television receiver 220.

If it is desired to adjust the fine tuning of the television receiver 20 when the volume control function is conditioned to be remotely controlled, the transmitter 224 is operated to radiate the first ultra-sonic signal and causes the selector relay 230 to operate. The operation of the relay 230 causes the control shaft 264 to move 90° in a clockwise direction, as seen in FIGS. 6 and 7, so that the cylindrical non-camming portion 265 of the cam 272b moves opposite the finger 266b to render the finger 266b inoperative, and the flattened camming portion 263 of the cam 262 moves opposite the fine-tuning actuating finger 266c to render the finger 266c operative. Since the cylindrical non-camming portion 265 of the cams 262a and 262d remain opposite the fingers 266a, and 266d, the fingers 262a, 262d remain inoperative. Thus, the mechanical function selector 232 operates to condition the mechanical condition selector 236 for predetermined operation; more particularly, only the fine-tuning actuating finger 266 is rendered operative to actuate its associated ratchet wheel 272c incident to operation of the condition selector relay 230a.

The fine tuning of the receiver 220 is changed by transmitting a second ultra-sonic signal which causes the condition selector relay 234 to operate and move its armature lever 268 from the position illustrated in FIG. 6 to the position illustrated in FIG. 7. During this movement the tip 271 of the fine-tuning actuating finger 266c engages and steps a ratchet wheel 272c which is locked to a control cam 276c by a sleeve 283c, the ratchet wheel 272c, sleeve 283c and the cam 276c being rotatably mounted on the shaft 282. Consequently, the cam 276c is turned conuterclockwise into an adjacent operative position. However, because the tips 271 of the actuating fingers 266a, 266b, and 266d are below their ratchet wheels 272, the longitudinally displaced fingers 266 do not engage and step their ratchet wheels 272, and thus the control cams 276 are not turned.

The fine-tuning cam 276 has a construction best illustrated in FIG. 9 and includes a plurality of camming portions 300, 302, 304, 306, 304 and 302, adapted to coact with a resilient cam follower 284c. The cam follower 284c is, of course, responsive to the movement of the cam 276a to open and close selected ones of contacts 308a, 308b and 308c, the contacts 308a being mounted, respectively, on the follower 284c and a resilient conductive support 288c and the contacts 308b and 308c being mounted only on resilient, conductive supports 288c. These supports 288c are spaced apart by insulating blocks 289c suitably secured to the upstanding casing plate 242. These supports 288c are electrically connected to resistors, not shown, and similar to resistors 128, which are selectively connected into the fine tuning section of the receiving circuits of the receiver 220 under the control of the cam and follower arrangement, described above. The resistors, not shown, perform the same general function as the resistors 128, but, in contrast with the resistors 128 which are connected in series, the resistors are connected in shunt. Furthermore, the fine tuning resistors are selectively connected together in a different manner from the volume control resistors; particularly, in contrast to the volume control cam 276b which successively opens and then simultaneously closes the contacts 290a, 290b, and 290c, the cam 276c successively opens and then successively closes the contact 308a, 308b, and 308c. The contrast in the construction and operation of the cams 272b and 272 should be apparent from a comparison of FIGS. 9 and 10.

In actual practice, the transmitter 224 is repeatedly operated to successively radiate second ultra-sonic signals which repeatedly operate the selective condition relay 234. The relay 234 causes the cam 276c to be stepped and different contacts 308 to be operated until the proper amount of resistance is connected to the fine tuning section of the receiving circuits to obtain the desired fine tuning of the receiver 220.

If it is desired to turn the television receiver 220 on or off when the volume control function is conditioned to be remotely controlled, the transmitter 224 is operated to transmit three of the first ultra-sonic signals, thereby to cause the function selector relay 230 to operate three times and rotate the control shaft 264 three times or 270°. Accordingly, the camming portion 263 of the cam 262a is moved opposite to the on-off actuating finger 266a, thereby permitting the finger 266a to be moved into its operative position under the control of the coil spring 270a.

Assuming that the receiver 220 is in an on condition, the transmitter 224 is operated to radiate a second ultra-sonic signal to cause the operation of the condition selective relay 234. The on-off actuating finger 266a moves to the right, as viewed in FIGS. 6 and 7, to engage and step the ratchet wheel 272a which is locked to an on-off control cam 276a by a sleeve 283a, the ratchet wheel 272a, the cam 276a and the sleeve 283a being rotatably mounted on the shaft 282. The on-off control cam 276a is illustrated in detail in FIG. 11 and includes alternate camming portions 314 and 316, respectively corresponding to the on and off condition of the television receiver 220. The stepping of the ratchet wheel and this control cam 276a by the relay 234 causes a resilient cam follower 284a of a switch 286a to be moved from a position in engagement with a camming portion 314 into a position in engagement with a camming portion 316, illustrated in FIG. 11. The cam follower 284a effects the opening of contacts 310a mounted on resilient supports 288a, which are serially connected in one of the conductors of a plug used to supply power to the receiver power source. Thus, incident to the opening of the contacts 310a, the energization circuit for the power source of the television receiver 220 is opened, thereby turning the receiver 220 off. The receiver 220 is turned on again by operating the transmitter 224 to radiate a second ultra-sonic signal, to operate the relay 234, to longitudinally displace the actuating finger 266a in order to step the ratchet wheel 272a, and to turn the cam 276a so that the cam follower 274c engages the camming portion 314 and closes the contacts 310a. Accordingly, the energization circuit for the power source is closed and the receiver 220 is returned to its on condition.

If it is desired to change the channel to which the television receiver 220 is tuned when the on-off control function is selected to be remotely controlled, the transmitter 224 is operated to radiate three of the first ultra-sonic signals, whereby the function selector relay 230 is operated three times to cause the control shaft 264 to be rotated 270° to bring the camming portion 263 of the cam 262d opposite to the channel selector actuating finger 266d. Once the actuating finger 266d is rendered operative, the transmitter 224 is operated to radiate a second ultra-sonic signal, thereby to effect the operation of the condition selective relay 234 and move the armature lever 268. As a result of the armature movement, the finger 266d is displaced longitudinally to step the ratchet wheel 272d which is locked to a channel selection control cam 276d by a sleeve 283d, the ratchet wheel 272d, the sleeve 283d and the cam 276d being rotatably mounted on the shaft 282. Thus, the channel selector cam 276d also turns counterclockwise from a position illustrated in FIG. 8 to a position (not shown) which is displaced approximately 10° from the position in FIG. 8. The channel selector cam 276d differs substantially from the volume control, fine tuning and on-off cams 276a, 276b and 276c in that it includes a finger camming portion 316 (see FIG. 8) which coacts with a resilient cam follower 284d to close a pair of contacts 318 respectively supported by resilient support 320 and the cam follower 284d. The cam follower 284d also differs from the followers 284a, 284b and 284c in that it does not include a convex end; thus, the cam follower 284d does not hold or retain the cam 276d after the operation of the relay 234, as does the other cam followers 284a, 284b and 284c, but because of its resiliency, actually returns the cam 276d and the associated ratchet wheel 272d to their original positions shown in FIG. 8. In any event, the spring arms 320 are electrically connected to a programming mechanism, similar to the programming mechanism 414 described above, so that incident to the closure of the contacts 318 a tuner motor is rendered operative to turn the main tuning shaft of the receiver 220 to another channel position. It will be appreciated that successively radiated second ultra-sonic signals will successively operate the selective relay 234 to cause the channel selector cam 272 to repeatedly close the contacts 318, thereby to cause the programming mechanism to tune the receiver 220 to successively higher channels.

In a modified form of the two-button, electro-mechanical embodiment, a plurality of switches, similar to the switches 83—85 and 89—86, are employed instead of the control cams 276a, 276b and 276c, cam followers 284a, 284b and 284c and switches 286a, 286b and 286c while a pair of contacts are substituted for the ratchet wheel 272d and associated cam 276d. Accordingly, the on-off, volume control, and fine-tuning actuating fingers step ratchet wheels which are mechanically connected to the wipers of switches similar to switches 83—85 and 89—86, while the channel-selector actuating finger directly closes the pair of contacts. The operation of the modified control system is, of course, identical to operation of the two-button, electro-mechanical embodiment described immediately above.

It will be understood that the two-button electro-mechanical embodiment of FIG. 3 is not limited to remotely controlling only the above described four control functions. Similar to the two-button, electrical embodiment of FIG. 1, the remote control system 222 can control any number of control functions by simply embodying additional control cams 262, ratchet wheels 272, cams 276, switches 284, and associated circuits. In contrast to the FIG. 1 embodiment in which an additional relay is required for each additional control function, the FIG. 3 embodiment only requires two relays irrespective of the number of control functions and, hence, offers very practical and economical advantages.

Considering now the three-button, electro-mechanical embodiment of the control system illustrated in FIG. 12, the control system is generally similar to the two-button, electro-mechanical embodiment illustrated in FIG. 3, except that it embodies additional structure for additionally changing the operative condition of a selected control function in a way opposite to that obtained in the FIG. 3 embodiment. Specifically, in the FIG. 3 embodiment, the condition selective relay 234 and corresponding mechanical condition selector 236 change the operating condition of the selected control function in a predetermined way, for example, in the volume control function, the level of the volume can only be incrementally increased, i.e., stepped from mute, low, medium, high and back to the mute level. By contrast, in the FIG. 12 embodiment, the operative condition of the control function may be reversibly changed, for example, in the volume control function, the level of the volume can be incrementally increased or decreased at any time.

The three-button, electro-mechanical system 422 remotely controls a television receiver 420 and includes a control system 423 responsive to ultra-sonic signals radiated by a transmitter 424. The transmitter 424 differs from the transmitters 24 and 224 in that it includes an additional resonator rod for transmitting a third ultra-sonic signal. Briefly, the control system 423 comprises a microphone 426 for converting the three ultra-sonic signals into three distinguishable electric signals which are fed into a three-frequency selective amplifier network 328. The amplifier network 328 includes a discriminator circuit for respectively energizing conductors 429, 431 and 433 in response to the first, second, and third ultra-sonic or electrical signals. Identical to the FIG. 3 embodiment, the conductor 429, when energized, causes the operation of a mechanical function selector 432. The mechanical function selector 432 mechanically conditions an up mechanical condition selector 435 for a predetermined type of operation, i.e., it determines which one of the control functions of the receiver 420 is to be controlled when a condition selective relay 434 is operated by conductor 431 in response to the transmission of a second ultra-sonic signal from the transmitter 424. The mechanical condition selector 435 is operatively connected to one of the on-off, volume, fine tuning and channel selector circuits 425, 426, 427, and 428, associated with the television receiver circuit, and hence, alters the one circuit to increase the operative condition of the control function selected by the function selector relay 430. However, the mechanical function selector 432, in addition to mechanically conditioning the up mechanical condition selector 435 for a predetermined operation, also mechanically conditions a down mechanical condition selector 437 for a predetermined type of operation, i.e., it determines which of the control functions of the receiver 420 is to be controlled when a condition selector relay 436 is operated by conductor 433 in response to transmission of the third ultra-sonic signal transmitted from the transmitter 424. The down mechanical condition selector 437 is also operatively connected with the on-off, volume, fine tuning and channel selector circuits 425, 426, 427, and 428 associated with the television receiver circuit and, hence, alters the selected circuit to decrease the operative condition of the control function selected by the function selector relay 430. Accordingly, the down selector 437 when controlled by the relay 435 alters the condition of the above circuits to change the condition of the selected control function in a manner opposite to that which is obtained by the up mechanical selector 435. Therefore, by transmitting a second ultra-sonic signal the operative condition of the control function is increased and by transmitting a third ultra-sonic signal the operative condition of the control function is decreased.

Considering now the construction and operation of the three button, electro-mechanical embodiment of FIG. 12 in greater detail, attention is directed to the FIGS. 13 and 14 wherein the constructional details of a portion of the control system 223 are illustrated. Neither the transmitter 424 nor the portion of the control system 223 including the microphone 426 or the three frequency selective amplifier network 428 are illustrated. It will be appreciated that a different discriminator is embodied in the network 428 than is embodied in networks 28 and 228 since the discriminator in response to three electrical signals causes D.C. pulses to be applied to the three separate conductors 429, 431 and 433 connected respectively to the grids of three, normally non-conductive tubes, identical to the previously described tubes 79 and 81. The function selector relay 430, the up condition selective relay 434 and the down condition selective relay 436 are respectively controlled by the three tubes and accordingly, their energizing windings are connected in the respective plate circuits of the tubes. The function selector relay 430, mechanical function selector 432, up condition selector relay 434, and down mechanical condition selector 435 are similar in their construction to the previously described relays and selectors embodied in the two button electro-mechanical embodiment shown in FIG. 3. It will be remembered that in the FIG. 3 embodiment the on-off, volume, fine tuning, and channel selection control cams 276 are rotated only in a counterclockwise direction under the control of the selector relay 234 and, as previously noted, the operative condition of the selected control function is changed in accordance with the cycle of the camming portions on the cams 276. It will be appreciated that the camming cycle can be reversed if the control cams 276 are rotated in a reverse or clockwise direction and, thus, the type of change in the operative condition can be reversed. Accordingly, the three button, electro-mechanical embodiment includes the apparatus of the two button FIG. 3 embodiment and, in addition, apparatus for rotating the control cams in a reverse or clockwise direction. To this end, the down condition selective relay 436 and the mechanical condition selector 437 are embodied in the FIG. 12 embodiment and with the relay 436 conditioned for selective operation by the mechanical function selector 432, it operates in response to the third ultra-sonic signal to change the operative condition of the selected control function in a manner opposite to that obtained by the relay 434 and condition selector 435.

More specifically, the function selector relay 430 is suitably supported from a casing 440 by a U-shaped armature structure 434 and a J-shaped bracket 448. The relay 430 includes an armature plate 436, suitably biased by a coiled spring 438, provided with a pawl 442 and a stop 458 depending downwardly from its left end. The pawl 442 moves downwardly during operation of the relay 430 to engage and step a ratchet wheel 444 which is mounted on a shaft 446 journaled between the wall 444 of the casing 440 and the J support 448. The ratchet wheel supporting shaft drives a control shaft 464 through a gearing arrangement 465 comprising a gear 459 secured to the shaft 446, an idler gear 461 supported from the casing wall 444, and a gear 463 secured to the control shaft 464. Instead of only four control cams being secured to the control shaft 464, as in the case of the two button FIG. 3 embodiment, two sets of four cams, 452 and 462, are located on the shaft, the cams being so positioned on the shaft that pairs of cams 452a—462a, 452b—462b, 452c—462c and 452d—462d operate sequentially together. The cams 452 and 462 are spaced apart to respectively coact with actuating fingers 456 and 466 which are supported respectively by the armatures 458 and 468 of the relays 436 and 434, the actuating fingers 456 and 466 respectively comprising the up mechanical condition selector 435 and the down mechanical condition selector 437. Similar to the previously described cams 262, the cams 452 and 462 have generally cylindrical non-camming portions, 455 and 465, respectively, and flattened camming portions 453 and 463, respectively. The cams 452 and 462 are so related to one another that repeated operation of the selector relay 430 causes the pairs of cams 452a—462a, 452b—462b, 452c—462c and 452d—462d to sequentially render operative the actuating fingers 456a—466a, 456b—466b, 456c—466c and 456d—466d. The relay 434 is identical in constrution to the previously described relay 234 and is suitably secured to the floor 440a of the casing 440. It briefly comprises an armature lever 468 pivotally supported from the casing floor 440a and including spaced apart arms 468 having recesses defined at their upper ends to accommodate the actuating fingers 466. As shown in FIGS. 13 and 14, coiled springs 470 urge the fingers 466 into engagement with the cams 462, while coiled springs 473 urge the armature plate 468 into biased engagement with a support bracket 474 mounted on the floor 440a. The relay 436, on the other hand, is suitably secured to the roof 440b of the casing 440 and includes an armature lever 458 pivotally supported from the roof 440b of the casing. The armature lever 458 has a plurality of arms 458b which are differently spaced apart than the arms 468b, the arms 458b, however, also having recesses defined at their lower ends to accommodate the actuating fingers 456. As shown, coiled springs 460 urge the fingers 456 into engagement with the cams 452, while coiled springs 463 urge the armature plate into engagement with a bracket 477 mounted on the roof 440b. Accordingly, as best shown in FIG. 14, the fingers 452 and 462 are respectively supported from the lower and upper ends, respectively, of the armature arms 458b and 468b and are biased into engagement with the cams 452 and 462, respectively. The pairs of actuating fingers 452a—462a, 452b—462b, 452c—462c and 452d—462d are, respectively, operatively connected to the on-off circuit 425, the volume control circuit 426, the fine tuning circuit 427 and the channel selector circuit 228. These circuits comprise pairs of ratchet wheels 462a—472a, 462b—472b, 462c—472c and 462d—472d, respectively locked to cams 476a, 476b, 476c and 476d which are respectively identical in construction to the cams 276 described above and, coact with cam followers 484 of switches 486. The cam followers 484 and switches 486 are identical to the previously described cam followers 284 and switches 286 and function to selectively connect certain impedances to the circuit of the television receiver 420.

With the control system in the position illustrated in FIG. 13, the volume control function is conditioned to be operated since the camming portions 253 and 263 of the control cams 452b and 462b, respectively, oppose the fingers 456b and 466b. The balance of the actuating fingers 456 and 466 are disposed in their inoperative positions under the control of their associated cams 452 and 462. Thus, in response to a second ultra-sonic signal, the up condition selective relay 434 operates, thereby causing the finger 466b to step the ratchet wheel 472b and associated cam 476b in a counterclockwise direction as seen in FIG. 14. Accordingly, the cam follower 284 moves from engagement with the camming portion 277 (as shown in FIG. 14) into engagement with the cam portion 280, thereby closing all of the contacts 490a, 490b and 490c, to produce an incremental change in the volume level as previously described from high to off. With the FIG. 3 embodiment, if it is now desired to turn the volume on high, three additional ultra-sonic signals must be transmitted to incrementally increase the volume through low and medium to high. However, with the FIG. 12 embodiment, the volume level can be immediately returned to high by transmitting a third ultra-sonic signal. In response to the third ultra-sonic signal, the down condition selective relay 436 operates to cause its armature lever 258 to pivot into the position shown in FIG. 14 with the result that the actuating finger 456b moves rightwardly to engage and step the ratchet wheel 452b whose ratchets are oppositely related to the ratchets in wheel 462b. Thus the associated cam 476b moves in a counterclockwise direction as seen in FIG. 14 and the cam follower 484b is returned to the position it occupied before the transmission of the second ultra-sonic signal, i.e., in engagement with the camming portion 277. Thus, the contacts 290a, 290b and 290c are opened and the sound level of the receiver is returned immediately to high.

It will be noted that the brackets 474 and 477 are so located in the casing floor 440a and the casing roof 440b that when the armature levers 458 and 468 are in their inoperative positions, the tips of the fingers 456 and 466 are spaced to the left of the shaft 482. Thus, in contrast to the position of the tips of the fingers 266 which are slightly spaced from the ratchets of the ratchet wheels 272 and are located vertically underneath the shaft 282, as seen in FIG. 6, the tips of the fingers 466 are further spaced from the ratchets of the ratchet wheels 472 and are located to the left of the shaft 482, as seen in FIG. 14. By this construction, the ratchet wheel 472b is permitted to be rotated in a clockwise direction without interference from the tips of the fingers 466 and, conversely, the ratchet wheel 472b is permitted to be rotated in counterclockwise direction without interference from the tips of the fingers 456. Thus, in order that the tips of the fingers 456 and 466 engage the ratchet wheel 472b incident to operation of the relays 436 or 434, the displacement of the fingers 456 and 466 must necessarily be greater than the displacement of the fingers 266 in the FIG. 3 embodiment. This increased displacement is obtained by locating the brackets 477 and 474 on the casing 440 so that the armature levers 458 and 468 when in their inoperative positions are positioned further to the left than the armature lever 268 of the FIG. 3 embodiment.

As described above, if it is desired to adjust the fine tuning of the receiver 420 when the volume control function is conditioned to be remotely controlled, the transmitter 424 is operated to radiate a first ultra-sonic signal. The first ultra-sonic signal causes the function selector relay 430 to operate and the control shaft 464 to be rotated 90° to render the fine-tuning actuating fingers 456c and 466c operative. Thereafter, the transmitter 424 is operated to radiate either a second ultra-sonic signal or a third ultra-sonic signal for the purpose of operating either the up condition selective relay 434 or the down condition selective relay 436. Clearly, if successive second ultra-sonic signals are radiated, the relay 434 is successively operated to cause the finger 466c to successively step the ratchet wheel 472c, in a counterclockwise direction. This movement of the ratchet wheel 472c causes the fine tuning control cam 476c to successively rotate in a counterclockwise direction, as viewed in FIG. 14, thereby to effect a change in the position of the cam follower 484c, the associated switch contacts 486c and the number of resistors connected to the receiving circuits and, thus, a change in the operative condition of the fine tuning of the television receiver 420, as described hereinabove. However, if the receiver 420 becomes further mistuned, the adjustment can be reversed instead of continuing through the camming cycle as in the FIG. 3 embodiment. Accordingly, the transmitter is operated to successively transmit third ultra-sonic signals which effect the successive operation of the relay 436 to cause the fingers 456c to successively step the ratchet wheel 462c in a clockwise direction. This movement of the ratchet wheel 462c causes the cam 426c to rotate in a reverse or clockwise direction, thereby to cause the operative condition of the fine tuning functioning of the receiver 420 to change in a manner opposite to that obtained by stepping the cam 476c in a counterclockwise direction.

It will be understood that since the on-off function turns the receiver 420 on and off in response to successively radiated, second ultra-sonic signals, both of the up and down mechanical selectors 435 and 436 are actually not needed, the cam 452, actuating finger 456a and ratchet wheel 462a being illustrated in the interest of completeness. However, in the event that the volume control function is modified to include a receiver-off position, it is clear that the cam 452a and the electric components in the on-off circuit could be modified so that the cams 452a, 462a, fingers 456a, 466a, the ratchet wheels 462a, 472a, and the cam 476a could be used to control another receiver control function.

In order to rotate the main tuning shaft of the television receiver 420 in either direction, it is necessary that a bi-directional tuner motor be employed instead of a unidirectional motor which is satisfactory for either of the two previously described two-button embodiments. In this connection it is necessary that pairs of contacts be located on opposite sides of the operative fingers (similar to finger 316 on cam 276d in FIG. 8) of the cam 476d. These pairs of contacts are similar to the contacts 236d (FIG. 8), and are associated with a programming mechanism, similar to the programming mechanism 141 described above, which controls the energization of the bi-directional motor. Thus, when the cam 476d is rotated in a clockwise direction, one of the pairs of contacts is closed to so energize the motor that it rotates in a first direction and when the cam 476d is rotated in a counterclockwise direction, the other pair of contacts is closed to so energize the motor that it rotates in a second direction. In either event, the motor drives the main tuning shaft of the receiver 420 under the control of the programming mechanism.

An identification means, similar to the previously described identification means 79 of the embodiment of FIG. 1, is also used to identify the particular control function that is conditioned to be remotely controlled. To this end, a switch 472, similar to switch 272, is mechanically connected to the shaft 464 for the purpose of selectively illuminating suitable indicating windows located on the front of the television receiver 420.

From the foregoing description, it will be appreciated that if it is desired to change any of the control functions at any time, the transmitter 424 is operated to generate the required number of first ultrasonic signals to cause the relay 430 to rotate the control shaft and its associated cams into successive positions until the actuating fingers 456 and 466 associated with the selected control function are moved into operative position. Thereafter, depending upon whether it is desired to increase or decrease the operative condition of the selected control function, the transmitter is operated to radiate either second or third ultra-sonic signals to effect the operation of either the up condition selective relay 434 or the down condition selective relay 436. Depending upon which of the relays 434 or 436 operates, the control cam 476 for the selected control function is rotated in either a counterclockwise or a clockwise direction to more rapidly obtain the desired operative condition.

As in the case of the embodiments of FIG. 1 and FIG. 3, the control system 422 can be adapted to control additional control functions of the receiver, e.g., brightness and/or contrast. In this connection, the armature levers 458 and 468 are modified in construction to include additional arms 458b and 468b, additional fingers 452 and 462 are respectively mounted on the arms, additional cams 476 are secured to the shafts 464 and 482, and additional cam followers 284, switches 286 and impedances are employed. It will be appreciated that the operative condition of any number of control functions can be changed as desired, by a transmitter having only three resonator rods and a control system embodying only the above-described three relays.

While several embodiments described herein are at present considered to be preferred, it is understood that various modifications and improvements may be made therein, and it is intended to cover in the appended claims all such modifications and improvements as fall within the true spirit and scope of the invention.

What is claimed is:

1. In combination in a remote control system; means for remotely transmitting at least two ultrasonic control signals of different frequencies at different time periods; means for receiving and amplifying said control signals; discriminating means for segregating said control signals on the basis of frequency, said discriminating means including a first output circuit energizable responsive to receipt of said first frequency control signal and a second output circuit energizable responsive to receipt of said second frequency control signal; selecting means coupled to said first output circuit, said selecting means responsive to said first frequency control signal and including a selecting switch having a wiper arm, connected to said second output circuit, sequentially operable through a plurality of contact making positions; a plurality of controlled means each connected to an individual one of said contact making positions; said controlled means each having a plurality of operating positions and each controlled means including operating means responsive to said second frequency control signal for sequentially switching to successive ones of said plurality of operating positions; said selecting means operating said selecting switch to move said wiper arm to its succeeding contact making position for each transmission of said first frequency control signal; the operating means in the selected one of said plurality of controlled means sequentially switching from one of said operating positions to another of said operating positions responsive to each transmission of said second frequency control signal.

2. In combination in a remote control system; means for remotely transmitting at least two ultrasonic control signals of different frequencies at different time periods; means for receiving and amplifying said control signals; discriminating means including a first output circuit energizable responsive to receipt of said first frequency control signal and a second output circuit energizable responsive to receipt of said second frequency control signal; selecting means coupled to said first output circuit, said selecting means responsive to said first frequency control signal and including a selecting switch having a wiper arm, connected to said second output circuit, sequentially operable through a plurality of contact making positions; means indicating the particular one of said plurality of contact making positions said wiper arm is occupying; a plurality of controlled means each connected to an individual one of said contact making positions; said controlled means each having a plurality of operating positions and each controlled means including operating means responsive to said second frequency control signal for sequentially switching to successive ones of said plurality of operating positions; said selecting means operating said selecting switch to move said wiper arm to its succeeding contact making position for each transmission of said first frequency control signal; the operating means in the selected one of said plurality of controlled means sequentially switching from one of said operating positions to another of said operating positions responsive to each transmission of said second frequency control signal.

3. A remote control system including means for receiving and amplifying at least two remotely transmitted ultrasonic control signals of predetermined different frequencies, said control signals being transmitted at different time periods; segregating means for separating said control signals on the basis of frequency, said segregating means including a first output circuit energizable responsive to said first frequency control signal and a second output circuit energizable responsive to said second frequency control signal; selecting means coupled to said first output circuit, said selecting means being responsive to said first frequency control signal and including a selecting switch having a wiper arm, connected to said second output circuit, sequentially operable through a plurality of contact making positions; a plurality of controlled means each connected to an individual one of said contact making positions, said controlled means each having a plurality of operating positions and each controlled means including operating means responsive to said second frequency control signal for sequentially switching to successive ones of said plurality of operating positions; said selecting means operating said selecting switch to move said wiper arm to its succeeding contact making position for each transmission of said first frequency control signal; the operating means in the selected one of said plurality of controlled means sequentially switching from one of said operating positions to another of said operating positions responsive to each transmission of said second frequency control signal; and means coupled to said selecting means for visually indicating the particular one of said plurality of controlled means which is connected to said second output circuit.

References Cited in the file of this patent

UNITED STATES PATENTS

| | | |
|---|---|---|
| 1,055,929 | Long | Mar. 11, 1913 |
| 2,285,819 | Leathers | June 9, 1942 |
| 2,707,778 | Neiswinter | May 3, 1955 |
| 2,724,049 | Rouault | Nov. 15, 1955 |
| 2,817,025 | Adler | Dec. 17, 1957 |

FOREIGN PATENTS

| | | |
|---|---|---|
| 536,284 | Great Britain | May 8, 1941 |